(12) United States Patent
DeLisio et al.

(10) Patent No.: US 6,391,467 B1
(45) Date of Patent: May 21, 2002

US006391467B1

(54) CAST FILM MADE FROM METALLOCENE-CATALYZED POLYPROPYLENE

(75) Inventors: John P. DeLisio, Bridel (LU); Robert G. Peet, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/349,560

(22) Filed: Jul. 8, 1999

(51) Int. Cl.$^7$ .............................................. B32B 27/32
(52) U.S. Cl. .................. 428/516; 428/409; 264/211.12; 264/211.17; 264/212; 526/351; 526/941
(58) Field of Search ................................ 428/516, 220, 428/409; 264/211.12, 211.17, 212; 526/351, 941

(56) References Cited

U.S. PATENT DOCUMENTS

| | | | |
|---|---|---|---|
| 5,212,246 A | 5/1993 | Ogale | 525/240 |
| 5,254,394 A | 10/1993 | Bothe et al. | 428/212 |
| 5,340,917 A | 8/1994 | Eckman et al. | 528/481 |
| 5,462,807 A | 10/1995 | Halle et al. | 428/500 |
| 5,468,440 A | 11/1995 | McAlpin et al. | 264/291 |
| 5,529,843 A | 6/1996 | Dries et al. | 428/336 |
| 5,691,043 A * | 11/1997 | Keller et al. | 428/212 |
| 5,691,049 A * | 11/1997 | Morita et al. | 428/336 |
| 5,834,562 A * | 11/1998 | Silvestri et al. | 525/240 |
| 6,113,996 A * | 9/2000 | Amon et al. | 428/34.9 |

FOREIGN PATENT DOCUMENTS

| | | |
|---|---|---|
| EP | 484816 A1 | 10/1991 |
| EP | 697436 A1 | 2/1996 |
| EP | 732197 A1 | 9/1996 |

OTHER PUBLICATIONS

Database WPI, Section ch, Week 199604, Derwent Publications, Ltd., XP002146591 & JP 07 304877 A, Nov. 21, 1995.

Polymer, vol. 37, No 19, pp. 4417–4420 (Sep. 1, 1996), A comparison of the lamellar morphology of melt–crystallized isotactic and syndiotactic polypropylene, Loos J. et al.

* cited by examiner

*Primary Examiner*—Paul Thibodeau
*Assistant Examiner*—D. Lawrence Tarazano
(74) *Attorney, Agent, or Firm*—Dennis P. Santini; Rick F. James

(57) ABSTRACT

A cast film comprises a layer comprising a metallocene-catalyzed substantially syndiotactic propylene polymer. Optionally, the cast film has on at least one side an outer skin layer.

15 Claims, No Drawings

CAST FILM MADE FROM METALLOCENE-CATALYZED POLYPROPYLENE

FIELD OF THE INVENTION

The invention relates to a single or multi-layer cast film which contains a layer of metallocene-catalyzed substantially syndiotactic propylene polymer.

BACKGROUND OF THE INVENTION

Metallocene catalyzed propylene polymers are known to have a low melting temperature, relative to conventional propylene polymers. For this reason, metallocene-catalyzed propylene polymers have been described as useful as the outer layer heat sealable material of biaxially oriented multi-layer films in U.S. Pat. No. 5,468,440 (column 6, lines 32 to 41). Other multi-layer films in which the advantage of an outer layer of metallocene-catalyzed propylene polymers are described are found in U.S. Pat. Nos. 5,529,843 and 5,462,807. Although these patents describe multi-layer films in which an outer layer is made from a metallocene-catalyzed propylene polymer, the patents are silent on the use of metallocene-catalyzed propylene polymers in the core layer of a multi-layer film.

U.S. Pat. No. 5,254,394 to Bothe, et al., discloses a polyolefin film for packaging comprising isotactic polypropylene base layer and a top layer of syndiotactic polypropylene which has high sealed-seam strength and excellent optical properties. The top layer can contain lubricant additives, such as waxes at levels of up to 2 wt. % relative to each other.

U.S. Pat. No. 5,212,246 discloses a cast film material of a heterophasic olefin polymer composition and a random copolymer of propylene and ethylene which is formed into a film by a cast film process.

Typically, in the food-packaging area, the use of cast or nonoriented polypropylene is limited because such cast films tend to be brittle at below-freezing temperatures and are not generally used for heavy, sharp or dense products without lamination to more puncture-resistant materials.

SUMMARY OF THE INVENTION

The invention is directed to a cast film which comprises a metallocene-catalyzed substantially syndiotactic propylene polymer which has been found to overcome the problems associated with conventional cast polypropylene. Optionally, the film includes one or more coextruded additional layers. The invention is also directed to a process for making cast films.

DETAILED DESCRIPTION OF THE INVENTION

The film of this invention is a cast film which comprises a metallocene-catalyzed substantially syndiotactic propylene polymer. The cast film is produced by pouring, spreading or extruding a fluid thermoplastic material onto a temporary carrier, solidifying the material by any suitable means, and removing it from the carrier. The film may be solidified by cooling, curing, or heating or a combination of these steps appropriate to the material being processed. The cast film is not stretched in the manner of oriented films. Generally, the cast films are made by the well-known chill roll cast process, but other known methods can be used.

An essential feature of the present invention is a metallocene-catalyzed substantially syndiotactic propylene polymer. By "substantially syndiotactic propylene polymer," it is meant that the polymer generally possesses a syndiotacticty of at least 60% based on racemic pentads, typically greater than 70%, as measured by $C^{13}$ NMR spectroscopy. Useful substantially syndiotactic propylene polymers and methods of making them are found in U.S. Pat. Nos. 5,162,278; 5,158,920; 5,155,080; 5,036,034; 4,975,403; 4,892,851; and 4,794,096, which are incorporated herein by reference.

Metallocene-catalyzed syndiotactic polypropylene resins are available under the product name FINACENE by Fina, one example being FINACENE EOD 95-01.

The propylene polymer is predominantly comprised of propylene (at least 85% by weight) and has a melting point of about 135° C. or higher. The melt flow rate usually ranges from about 0.5 g/10 min to about 15 g/10 min at 230° C., more typically about 1.5 g/10 min to about 8 g/10 min at 230° C. The melt flow rate is measured in accordance with the standard ASTM D1238 method for propylene polymers.

The film can be fabricated with one or more outer layers. If outer layers are used, they may be any one of the coextrudable, film-forming resins known in the art. Such materials include isotactic polypropylene, propylene copolymers with a second monomer such as ethylene or butene-1, and propylene terpolymers which include additional monomers such as ethylene, butene-1, pentene-1, etc. Typical copolymers are ethylene-propylene copolymers and ethylene-butene-1 copolymers. Typical terpolymers are ethylene-propylene-butene-1 terpolymers. Blends of any of the foregoing homopolymers, copolymers and terpolymers are contemplated. The outer layer can be isotactic polypropylene, as discussed above.

Ethylene-propylene-butene-1 random terpolymers appropriate for use in the outer layer of the present invention include those containing 1–5 weight percent random ethylene and 10–35 weight percent random butene-1 with the balance being made up of propylene. The amounts of the random ethylene and butene-1 components in these terpolymers are typically in the range of 10 to 25 weight percent (ethylene plus butene-1) based on the total amount of the copolymer.

The copolymers and terpolymers typically have a melt flow rate in the range of about 5 to 10 with a density of about 0.9 and a melting point in the range of about 100 to about 130° C.

The polymers of the outermost layers of the film can also be fabricated from any polymers, copolymers or terpolymers or blends of homopolymers and blends of copolymer(s) and homopolymer(s) which have heat seal properties. Several of the materials identified above are illustrative of heat sealable copolymers which can be used in the present invention.

In one aspect of the invention the outer layer is derived from polyethylene. The polyethylene can be low density polyethylene (LDPE), linear low density polyethylene (LLDPE), medium density polyethylene (MDPE) or high density polyethylene (HDPE). These ethylene polymers typically have a melt index ranging from about 1 to about 15 g/10 min. The low density polyethylenes should have a density of about 0.88 to about 0.93 g/cm$^3$. Linear low density materials may have a density as high as 0.94 g/cm$^3$, often ranging from 0.90 to 0.94 g/cm$^3$, with a melt index of about 1 to about 10. The linear low density polyethylenes may be derived from ethylene together with other higher comonomers such as butene-1, hexene-1, or octene-1. HDPE has a density of greater than about 0.95 g/cm$^3$, typically from about 0.95 to about 0.965 g/cm$^3$. High density polyethylene suitable for use as the outer layer is described in Bakker, Ed. "The Wiley Encyclopedia of Packaging Technology," pp. 514 to 523 (1986).

There can be more than one outer layer on one or both sides of the core. That is, one or more layers can be applied to the exposed surface of the outer layer. Films having such a multi-layer structure are represented, in simplified form, as having a structure "ABCBA" where "C" represents a core layer, "B" represents an intermediate layer adjacent to the core layer and "A" represents a further outer layer or skin layer applied to the outer surface of intermediate layer "B." In such a film structure, the intermediate layer "B" can be referred to as a "tie-layer." Layers "A" and "B" can be the same or different. Additionally, structures containing more than five layers are contemplated, e.g., seven, nine, or more layers.

In order to improve or enhance certain properties of the cast films of the invention for specific end-uses, it is possible for one or more of the layers to contain appropriate additives in effective amounts. Preferred additives include antistatic agents, antiblocking agents, lubricants, stabilizers and/or alicyclic hydrocarbon resins. Such additives are further described in U.S. Pat. No. 5,254,394, which is incorporated herein by reference. It is useful to incorporate additives such as wax, finely divided inorganic antiblock particles, silicone oil, and silicone spheres, such as non-migratory particulate crosslinked hydrocarbyl substituted polysiloxane slip agent, one such material known as TOSPEARL which is marketed world-wide by Toshiba Silicone Co., Ltd. and in the United States by General Electric. Examples of alicyclic hydrocarbons which can be employed in the films, typically in the core layer, include polyterpene resins and petroleum resins.

Contemplated finely divided inorganic antiblock materials, referred to above, include syloid, a synthetic amorphous silica gel, having a composition of 99.7% $SiO_2$, diatomaceous earth having a composition of, for example, $SiO_2$ 92%, $Al_2O_3$ 3.3%, $Fe_2O_3$ 1.2%, which has an average particle size of about 5.5 microns, which particles are porous and irregularly shaped; dehydrated kaolonite (Kaopolite SF) having the composition $SiO_2$ 55%, $Al_2O_3$ 44%, $Fe_2O_3$ 0.4%, which has an average particle size of about 0.7 microns which particles are thin flat platelets; and synthetic precipitated silicates (Sipernat 44), for example, having a composition of $SiO_2$ 42%, $Al_2O_3$ 36%, $Na_2O$ 22%, which has an average particle size of about 3–4 microns which the particles are porous and irregularly shaped. Typically, a commercially available intensive mixer, such as those of the Boiling-or Banbury-type are to be employed in mixing a concentrate of the finely divided inorganic material and the selected polymer until there is a uniform dispersion of the inorganic material in the polymer. The amount of the antiblock, typically, ranges from about 0.03 to about 1 weight % based upon the weight of the polymer.

The alicyclic hydrocarbon is advantageously used to improve the barrier properties of the film. It has also been found that the alicyclic hydrocarbon contributes to film stiffness: the stiffness of the film increases as the amount of alicyclic hydrocarbon increases. The amount of alicyclic hydrocarbon employed in a layer of the film typically ranges from about 3 to about 15 wt. % based upon the weight of the layer. However, as those skilled in the art would understand, the amount is varied depending upon the degree of barrier properties and stiffness desired.

One or more of the exposed layers of the cast films of the present invention can be surface-treated to render the films receptive to printing inks, adhesives and/or coatings. The surface treatment can be carried out by any method known in the art such as corona discharge treatment or flame treatment.

Optionally a coating may be applied to the exposed surface of the outermost layer of the film. Prior to application of the coating material, the film may be surface treated or may be primed with a primer layer. Appropriate coatings contemplated include acrylic coatings such as those described in U.S. Pat. Nos. 3,753,769 and 4,865,908, PVDC coatings such as described in U.S. Pat. Nos. 4,214,039; 4,447,494; 4,961,992; 5,019,447 and 5,057,177, all of which are incorporated herein by reference. A vinyl alcohol polymer may also be used as a coating composition such as Vinol 325.

Appropriate primer materials are poly(ethyleneimine) and epoxy primers.

The outer surface of the film is preferably treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to gaseous chlorine, treatment with oxidizing agents such as chromic acid, hot air or steam treatment, flame treatment and the like. Although any of these techniques are effectively employed to pretreat the film surface, a particularly desirable method of treatment is the so-called electronic treatment method which comprises exposing the film surface to a high voltage corona discharge while passing the film between a pair of spaced electrodes. After electronic treatment of the film surface, the coating composition is then applied thereto.

The exposed treated or untreated surface of layer(s) "A" and/or "B" may have applied to it (them) coating compositions, as mentioned above, and/or substrates such as another polymer film or laminate; a metal foil such as aluminum foil; cellulosic webs, e.g. numerous varieties of paper such as corrugated paperboard, craft paper, glassines, cartonboard; nonwoven tissue, e.g., spunbonded polyolefin fiber, melt-blown microfibers, etc. The application may employ a suitable adhesive, e.g., a hot melt adhesive such as low density polyethylene, ethylene-methacrylate copolymer, water-based adhesive such as polyvinylidene chloride latex, and the like.

The coating composition should be applied in such amount that there will be deposited upon drying a smooth, evenly distributed layer, generally on the order of from about 0.01 to about 0.2 mil thickness (equivalent to about 0.2 to 3.5 g per 1000 sq. in. of film). In general, the thickness of the applied coating is such that it is sufficient to impart the desired seal sealability and/or oxygen and/or water vapor barrier characteristics to the resulting film. Generally, the coating comprises 1 to 25 wt %, preferably 7 to 15 wt % of the entire coated film composition. The coating on the film is subsequently dried by hot air, radiant heat or by any other convenient means.

Usually the film of the invention has a total thickness ranging from about 0.5 mil to about 20 mils, specifically from about 1 mil to about 5 mils. The thickness relationship of the layers can be important. In particular, the core layer is a relatively thick layer which constitutes about 70 to 100 percent of the total film thickness, the intermediate layer is of a thickness ranging from about 0 to about 20 percent of the total film thickness while any outer skin layer might range from about 0 to about 5 percent of the total film thickness.

The composition of each of the polymer chains in metallocene-catalyzed propylene polymers is more uniform than that of conventional propylene polymers which is thought to contribute to more uniform crystallinity and improved barrier properties.

Cast films produced from metallocene-catalyzed polyolefin core and/or skin resins have been found to have beneficial organoleptic properties; that is, the film does not have a strong odor or taste which can be associated with conventional resins, such as Ziegler-Natta catalyzed propylene polymer. This is a useful attribute especially in food and tobacco packaging where objectionable odors and/or flavors can be transmitted to the food and tobacco products.

The present invention also relates to a process for making the cast film of the invention. The film can be made by known extrusion or coextrusion processes. In the coextrusion process, melts corresponding to the individual layers of the film are coextruded through a flat die and the film thus obtained is drawn off on one or more rollers for solidification. The film, then is heat-set and, if desired, surface-treated such as by corona discharge treatment, if appropriate for the final application of the film.

In accordance with the method of the present invention, the polymer or the polymer mixture of the individual layers initially is compacted and liquefied in an extruder, as is typical in a coextrusion process, together with any optional additives. The melts then are simultaneously forced through a die (slot die), and the extruded composite film is drawn off on one or more draw-off rollers, during which it solidifies. The film then is wound up in the usual manner by a winding device.

EXAMPLE 1

A coextruded film 1.25 mils thick comprising a film having a core layer of a metallocene-catalyzed syndiotactic propylene polymer, FINACENE EOD 95-01 sold by Fina Oil and Chemical Company, with skin layers of a conventional propylene homopolymer, Fina 3371 sold by Fina Oil and Chemical Company, on each surface of the center layer was prepared by the chill roll cast film technique described above. Specifically, the layers were coextruded at a temperature of 480° F., wherein the die gap was about 30 mils, at a speed of about 300 feet/minute onto a casting drum that is maintained at a temperature of 100 to 110° F. The film was then transferred to two chill rolls maintained at a temperature of 60° F. and then the film was wound up. The core layer was 90% of the total film thickness while the skin layers were each 5% of the total film thickness. The properties of the film of the example are reported in Table 1.

What is claimed is:

1. A cast, nonoriented film which comprises at least one layer comprising a metallocene-catalyzed substantially syndiotactic propylene polymer, wherein one or both exposed surfaces of the cast, nonoriented film is subjected to corona discharge treatment or flame treatment.

2. The cast, nonoriented film of claim 1, which further comprises a first skin layer and a second skin layer located on an outer surface of the layer comprising- the metallocene-catalyzed substantially syndiotactic propylene polymer.

3. The cast, nonoriented film of claim 2, in which the material of at least one skin layer is an olefinic homo-, co- or terpolymer containing ethylene, propylene, and/or butene-1.

4. The cast, nonoriented film of claim 2, in which the material of at least one skin layer comprises an ethylene-propylene copolymer, ethylene-butene-1 copolymer, polyethylene, high density polyethylene (HDPE), or ethylene-propylene-butene-1.

5. The cast, nonoriented film of claim 1, further comprising an additive selected from the group consisting of antistatic agents, antiblocking agents, lubricants, stabilizers, and/or alicyclic hydrocarbon resins.

6. The cast, nonoriented film of claim 1, in which a coating is applied to one or both exposed surfaces of the cast, nonoriented film.

7. The cast, nonoriented film of claim 1, in which the overall thickness is from about 0.5 mil to about 20 mils.

8. A process for producing a cast, nonoriented film, wherein the process comprises: (a) extruding a layer comprising a metallocene-catalyzed substantially syndiotactic polypropylene through a die; (b) drawing off on one or more roller(s) for solidification; and (c) heat-setting the film; and further wherein the process excludes an orienting step.

9. A cast, nonoriented film, which comprises at least one layer comprising a metallocene-catalyzed substantially syndiotactic propylene polymer, the metallocene-catalyzed substantially syndiotactic propylene polymer having a melting point of about 135 degrees C. or higher and a melt flow rate of from about 0.5 g/10 min to about 15 g/10 min at 230 degrees C., wherein one or both exposed surfaces of the cast, nonoriented film is subjected to corona discharge treatment or flame treatment.

10. The cast, nonoriented film of claim 9, which further comprises a first skin layer and a second skin layer located on an outer surface of the layer comprising the metallocene-catalyzed substantially syndiotactic propylene polymer.

11. The cast, nonoriented film of claim 10, in which the material of at least one skin layer is an olefinic homo-, co- or terpolymer containing ethylene, propylene, and/or butene-1.

TABLE 1

| EXAMPLE | Tensile Properties | | | | | | Optics | | Barrier | |
|---|---|---|---|---|---|---|---|---|---|---|
| | Modulus[1] | | Elongation at Break[2] | | Ultimate Tensile[3] | | | | | |
| | MD | TD | MD | TD | MD | TD | Haze[4] | Gloss[5] | WVTR[6] | TO$_2$[7] |
| 1 | 76 | 90 | 500 | 642 | 5.1 | 3.3 | 4.3 | 65.9 | 1.16 | 31 |

[1]psi; ASTM D882
[2]percent; ASTM D882
[3]psi; ASTM D882
[4]percent light transmitted; ASTM D1003
[5]percent light reflected at a 45 degree angle; ASTM D2457
[6]water vapor transmission rate in g/100 in$^2$/day; ASTM F1249
[7]oxygen transmission rate in g/100 in$^2$/day; ASTM D3985

12. The cast, nonoriented film of claim 10, in which the material of at least one skin layer comprises an ethylene-propylene copolymer, ethylene-butene-1 copolymer, polyethylene, high density polyethylene (HDPE), or ethylene-propylene-butene-1.

13. The cast, nonoriented film of claim 9, further comprising an additive selected from the group consisting of antistatic agents, antiblocking agents, lubricants, stabilizers, and/or alicyclic hydrocarbon resins.

14. The cast, nonoriented film of claim 9, in which a coating is applied to one or both exposed surfaces of the cast, nonoriented film.

15. The cast, nonoriented film of claim 9, in which the overall thickness is from about 0.5 mil to about 20 mils.

* * * * *